J. LACEY & G. B. CORNELL

Said LACEY assignor to said CORNELL.

Bung-Wrenches.

No. 8,468. Reissued Oct. 29, 1878.

Witnesses:
Frederick J. Goodwin
Henry S. Doyle,

Inventors:
John Lacey
George B. Cornell
By Geo. H. Whipple
Attorney

N. PETERS, PHOTO-LITHOGRAPHER, WASHINGTON, D. C.

UNITED STATES PATENT OFFICE.

JOHN LACEY AND GEORGE B. CORNELL, OF CHICAGO, ILLINOIS; SAID LACEY ASSIGNOR TO SAID CORNELL.

IMPROVEMENT IN BUNG-WRENCHES.

Specification forming part of Letters Patent No. 118,617, dated August 29, 1871; Reissue No. 5,026, dated August 6, 1872; Reissue No. 8,468, dated October 29, 1878; application filed August 21, 1878.

*To all whom it may concern:*

Be it known that we, JOHN LACEY and GEORGE B. CORNELL, of Chicago, in the county of Cook and State of Illinois, have invented an Improved Wrench for inserting screw-threaded metallic bushes into the bung-holes of barrels or casks; and we do hereby declare the following specification to be such full, clear, and exact description of our said invention as to enable others skilled in the art to which it relates to construct and use the same, reference being had to the accompanying drawings, in which—

Figure 1:
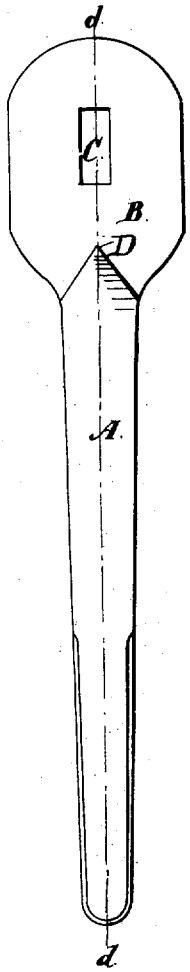
Figure 2:
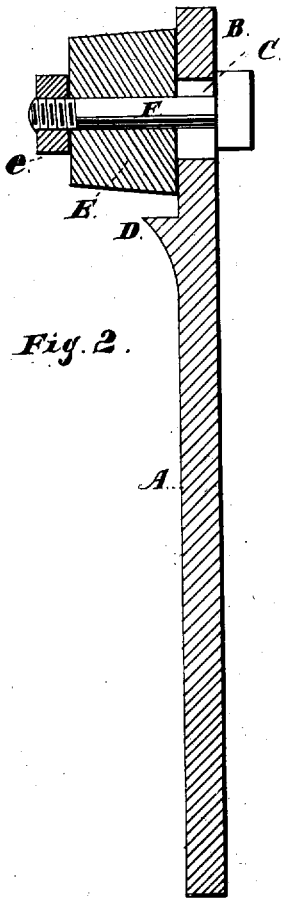
Figure 3:
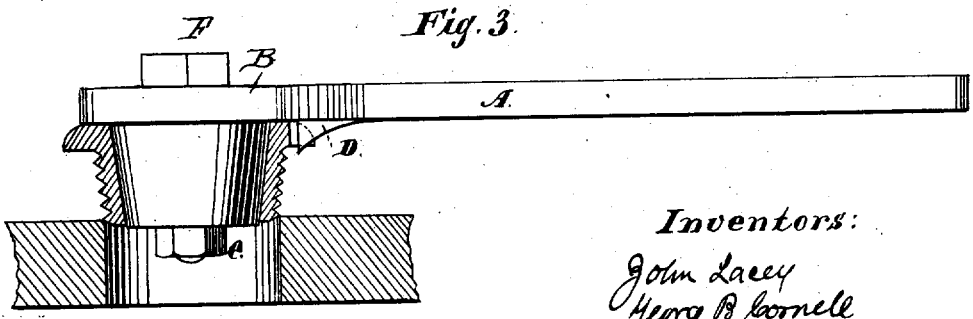

Figure 1 is a bottom view of a wrench embodying our said invention. Fig. 2 is a horizontal central section of the same, taken on the line *d d* through Fig. 1. Fig. 3 shows the manner of inserting a bush.

Similar letters of reference indicate like parts in all the figures of the drawings.

Our said invention relates to a wrench used in screwing metallic screw-threaded bushes into bung-holes; and the improvement consists in providing the shank of the wrench with a cylindrical core, so made as to closely fit the orifice of the bush, and a means adapted to connect the core with the bush, so as to make them revolve together, whereby the bush may be turned and screwed into place within the bung-hole without assuming an oblique position, all of which will be more fully understood from the following description and claims.

In the drawings, A represents the shank of the wrench, which consists of a plain metal bar, of the requisite length, widened at one end into a plate, B, having an elongated mortise, B, as shown in Fig. 1. The shank is so formed at its junction with the plate as to provide a projection, D, the front of which extends forward toward the center of the plate.

E represents a cylindrical cast-metal core, which is made tapering, so as to fit into the orifices of the bush to be screwed into the bung-hole. This core is made separate from the plate, and is attached thereto by means of a bolt, F, passing through the mortise in the plate and lengthwise through the core, as shown in Fig. 2, so as to admit of being removed by taking off the nut *e* to allow a core of larger or smaller diameter to be substituted, when desired to screw in bushes of larger or smaller diameter, and for this purpose the elongation of the mortise is made to permit the moving of the bolt toward or from the projection D, which moving of the bolt is necessary in using cores of different diameters.

In using our said invention, the core is inserted into the orifice of the bush, and turned until the projection D falls into a notch in the bush adapted to fit the same, and by means of the core the bush is kept steady and prevented from assuming an oblique position while being screwed into place, and by the contact or engagement of the projection on the wrench with the notch in the bush the wrench and bush are so connected as to revolve together, thereby enabling the bush to be readily screwed in the bung-hole.

Having thus described our invention, what we claim is—

1. In a wrench for inserting screw-threaded bung-bushes, a tapering cylindrical core adapted to fit the orifice of the bush, and a projection or means for connecting the wrench to the bush, so as to cause the bush to revolve with the wrench, substantially as and for the purpose specified.

2. The combination, in a wrench for inserting screw-threaded bung-bushes, of a tapering cylindrical core adapted to fit the bore of the bush, a handle for rotating said core, and a mechanism for connecting said core to the bush, so as to cause the bush to revolve with said core, substantially as specified.

3. In combination with the shank or handle of a wrench for inserting screw-threaded bung-bushes, a tapering cylindrical core adapted to fit the orifice of the bush to be inserted to control the direction of the bush and prevent the bush from assuming an oblique position in the bung-hole with reference to the face of the stave while being screwed in, substantially as described.

4. A wrench consisting of a shank, A, plate B, projection D, and core E, said core being adapted to fit the orifice of the bush and prevent it from assuming an oblique position while being screwed into place, substantially as and for the purpose specified.

JOHN LACEY.
GEORGE B. CORNELL.

Witnesses:
JNO. H. WHIPPLE,
FREDERICK F. GOODWIN.